(12) United States Patent
Sahinoglu

(10) Patent No.: US 7,280,561 B2
(45) Date of Patent: Oct. 9, 2007

(54) DYNAMIC ASYNCHRONOUS BANDWIDTH ALLOCATION WITH MULTIPLE PREDICTORS FOR VARIABLE BIT RATE TRAFFIC

(75) Inventor: Zafer Sahinoglu, Clifton, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1035 days.

(21) Appl. No.: 10/175,760

(22) Filed: Jun. 20, 2002

(65) Prior Publication Data

US 2003/0235208 A1    Dec. 25, 2003

(51) Int. Cl.
*H04J 3/16* (2006.01)
*G06F 15/173* (2006.01)
(52) U.S. Cl. ...................... 370/468; 709/226
(58) Field of Classification Search ................ 370/468
See application file for complete search history.

(56) References Cited

U.S. PATENT DOCUMENTS

| | | | |
|---|---|---|---|
| 6,650,869 B2 * | 11/2003 | Kelly et al. ................. | 455/13.2 |
| 6,973,096 B2 * | 12/2005 | Chappell et al. ............ | 370/468 |
| 6,987,728 B2 * | 1/2006 | Deshpande ................. | 370/229 |
| 7,027,403 B2 * | 4/2006 | Porikli et al. ............... | 370/238 |

\* cited by examiner

*Primary Examiner*—Steven Nguyen
(74) *Attorney, Agent, or Firm*—Dirk Brinkman; Clifton D. Mueller; Gene V. Vinokur

(57) ABSTRACT

With multiple predictors, a method dynamically allocates bandwidth to traffic having a variable data rate in a network. A first amount P-I of bandwidth is allocated in a first state of a state machine. A second amount P-II of bandwidth is allocated in a second state of the state machine, and a third amount of bandwidth P-III is allocated in a a third state of the state machine such that P-II>P-I>P-III. Cost functions are periodically evaluated to transition between the first, second, and third states of the state machine.

5 Claims, 7 Drawing Sheets

| Variable | Term |
|---|---|
| X(n) | # of bits received(counted) in time slot n |
| q(n) | Queue size in time slot n (bits) |
| s(n) | Under-utilization in time slot n (bits) |
| $E_i$ | Signal energy in frequency sub-band i |
| $X_{dc}$ | Bandwidth for starvation prevention |
| a(n) | Bandwidth allocated during time slot n |
| $\bar{\rho}$ | Average utilization |
| p(n) | Instantaneous utilization in time slot n |
| $T_{max}$ | Maximum renegotiation-cost (bits) |
| $T_{min}$ | Minimum renegotiation-cost (bits) |

*Fig. 1a*

| Variable | Term |
|---|---|
| α | Buffering cost coefficient |
| β | Under-utilization cost coefficient |
| r | Feasible renegotiation interval |
| u(n) | Under-utilization cost at the end of time slot n |
| b(n) | Buffering cost at the end of time slot n |
| CFI | Current Frame Index |
| LRI | Frame index at last renegotiation |
| IRI | Inter renegotiation interval |
| B | 0.99 quantile queue size |
| N | Number of renegotiations |

*Fig. 1b*

Star-Wars MPEG-1 Frame Trace

| Method | N Util | 0.99Q | (Kb) |
|---|---|---|---|
| R++ | 882 | 237 | 90 |
| [Casilari] | 882 | 577 | 90 |
| RCBR | 1291 | 243 | 88 |
| RDBA | 1129 | 230 | 72 |
| NLMS | 780 | 410 | 78 |
| [Casilari] | 474 | 620 | 82 |
| R++(GOP) | 474 | 251 | 82 |

*Fig. 6a*

Soccer MPEG-1 Frame Trace

| Method | N Util | 0.99Q | (Kb) |
|---|---|---|---|
| R++ | 1040 | 299 | 93 |
| RCBR | 1321 | 324 | 93 |
| RDBA | 1314 | 390 | 83 |
| NLMS | 660 | 2500 | 92 |
| [Casilari] | 1040 | 1570 | 93 |

*Fig. 6b*

DYNAMIC ASYNCHRONOUS BANDWIDTH ALLOCATION WITH MULTIPLE PREDICTORS FOR VARIABLE BIT RATE TRAFFIC

FIELD OF THE INVENTION

This invention relates generally to resource allocation in communications networks, and more particularly to asynchronous dynamic bandwidth allocation for variable bit rate traffic in ATM networks, and to resource reservation and bandwidth management for variable bit rate traffic in RSVP (Resource ReSerVation Protocol) routers.

BACKGROUND OF THE INVENTION

Asynchronous transfer mode (ATM) networks provide applications with a QoS connection-oriented service that has guaranteed bandwidth for sending data packets or "traffic" over the network. To send the packets, the application requests a virtual circuit (VC) with an initial bandwidth allocation. After the VC has been assigned to the application, an adaptation layer of the network determines how long to keep the VC open for the initial bandwidth assignment. As long as the sending rate of the packets matches the allocated bandwidth, the VC is kept open, see H. Saran, S. Keshav, "*An empirical Evaluation of Virtual Circuit Holding Times in IP over ATM Networks,*" Proc. of INFOCOM 1994, Y. Afek, M. Cohen, E. Haalman, Y. Mansour, "*Dynamic Bandwidth Allocation Policies,*" 0743-166X/96 IEEE, and S. K. Biswas, R. Izmailov, "*Design of a fair Bandwidth allocation Policy for VBR Traffic in ATM Networks,*" IEEE/ACM Trans. On Networking, V:8, N:2, April 2000. However, if the application sends packets at a higher or lower rate, then there may be a need to adjust or "renegotiate" the allocated bandwidth.

Bandwidth allocation is a particular problem for streaming content, for example, videos. In videos, frame sizes can vary greatly over both short and long time intervals leading to "burstiness" in the traffic. Scene changes and group of picture (GOP) structures within scenes also impact bandwidth requirements. Any of these conditions can result in either poor utilization or delay. For real-time traffic where delays can not be tolerated, data may be lost.

A number of bandwidth predictors and renegotiation methods are known in the prior art. Typically, those methods are either static (off-line), or dynamic (on-line or real-time). Off-line systems can determine the exact bandwidth characteristics of stored videos. However, off-line systems typically have a complexity and computational overload that are not suited for real-time applications.

Dynamic bandwidth allocation requires a good traffic rate predictor and a decision unit that can determine when to change the service rate and required bandwidth for each outgoing stream while at the same time minimizing the number of updates and the allocated bandwidth. Dynamic bandwidth allocation attempts to maximize utilization by minimizing the amount of allocated bandwidth, while at the same time minimizing buffer occupancies (delay). However, even with dynamic bandwidth allocation schemes, it is still difficult to predict the size of future frames. Frequent real-time scalability in spatial and temporal SNR also increases the complexity of the problem. Quality of Service (QoS) for VBR traffic can be achieved with stringent packet and cell loss rates, delay constraints, and high bandwidth channels, but at the expense of low utilization.

Dynamic bandwidth allocation methods can be split into two groups: synchronous and asynchronous. With synchronous methods, bandwidth allocations are modified periodically, at fixed time intervals. Synchronous bandwidth allocation can suffer from the same problem as off-line methods, because during the fixed time intervals the allocations are static.

With asynchronous methods, bandwidth allocations are updated as needed. For example, periodic renegotiations periodically measure an average arrival rate within a given time interval to determine a new bandwidth for a next interval, see Casilari et al. "*Bandwidth renegotiation scheme for VBR video services,*" IEEE Electronics Letters, v:35, n:18, September 1999. Grossglauser et al., in "*RCBR:A Simple and Efficient Service for Multiple Time Scale Traffic,*" IEEE Trans. on Networking, v:5, n:6, December 1997, assume a constant cost per renegotiation and allocated bandwidth. That method is based on bandwidth estimators, and high and low buffer threshold parameters, and a time constant T.

Porikli et al., in "Dynamic Bandwidth Allocation with Optimal Number of Renegotiations in ATM Networks," Proc. of ICCCN'01, pp. 290-295, 2001, attempt to determine an optimum number of renegotiations, see also U.S. Pat. No. 7,027,403 "Method and System for Minimizing Error in Bandwidth Allocation with an Optimal Number of Renegotiations," filed by Porikli et al., on May 22, 2001, incorporated herein in its entirety by reference. They measure the current data rate to predict future data rates. They use the current data in a cost function to minimize the cost of renegotiation over time.

In U.S. Pat. No. 7,027,391 "Adaptive Bandwidth Allocation by Wavelet Decomposition and Energy Analysis of Network Traffic," filed by Sahinoglu on Apr. 26, 2001, incorporated herein by reference in its entirety, measure and group data rates into overlapping vectors during fixed length time intervals. Discrete wavelet transform are applied to the overlapping vector to determine frequency bands and associated energies of the data rate, and allocate bandwidth accordingly.

Adas, in "*Using Adaptive Linear Prediction to Support Real-time VBR Video Under RCBR Network Service Model,*" IEEE Trans. on Networking, v:6, n:5, October 1998, uses a normalized least-mean-square (NLMS) process to predict a next GOP rate for the purpose of dynamic bandwidth allocation.

SUMMARY OF THE INVENTION

The invention dynamically allocates bandwidth for variable bit-rate (VBR) traffic in a network that supports bandwidth renegotiations. The invention does not assume any prior knowledge of traffic. The method according to the invention achieves better link utilization and lower 0.99-quantile queue sizes, after a fewer number of renegotiations than prior art methods.

More particularly with multiple predictors, a method dynamically allocates bandwidth to traffic having a variable data rate in a network. A first amount P-I of bandwidth is allocated in a first state of a state machine. A second amount P-II of bandwidth is allocated in a second state of the state machine, and a third amount of bandwidth P-III is allocated in a third state of the state machine such that P-II>P-I>P-III. Cost functions are periodically evaluated to transition between the first, second, and third states of the state machine.

BRIEF DESCRIPTION OF THE DRAWINGS

FIGS. 1a and 1b are tables of variables and terms used to describe the invention;

FIGS. 6a and 6b compare the performance of the bandwidth allocation method according to the invention with prior art allocation methods.

DETAILED DESCRIPTION OF THE PREFERRED EMBODIMENT

Finite State Bandwidth Allocation Model

FIGS. 1a and 1b show variables and term definitions used to describe the invention, these variables and their use are describe in greater detail below.

Finite State Machine

Figure 2:
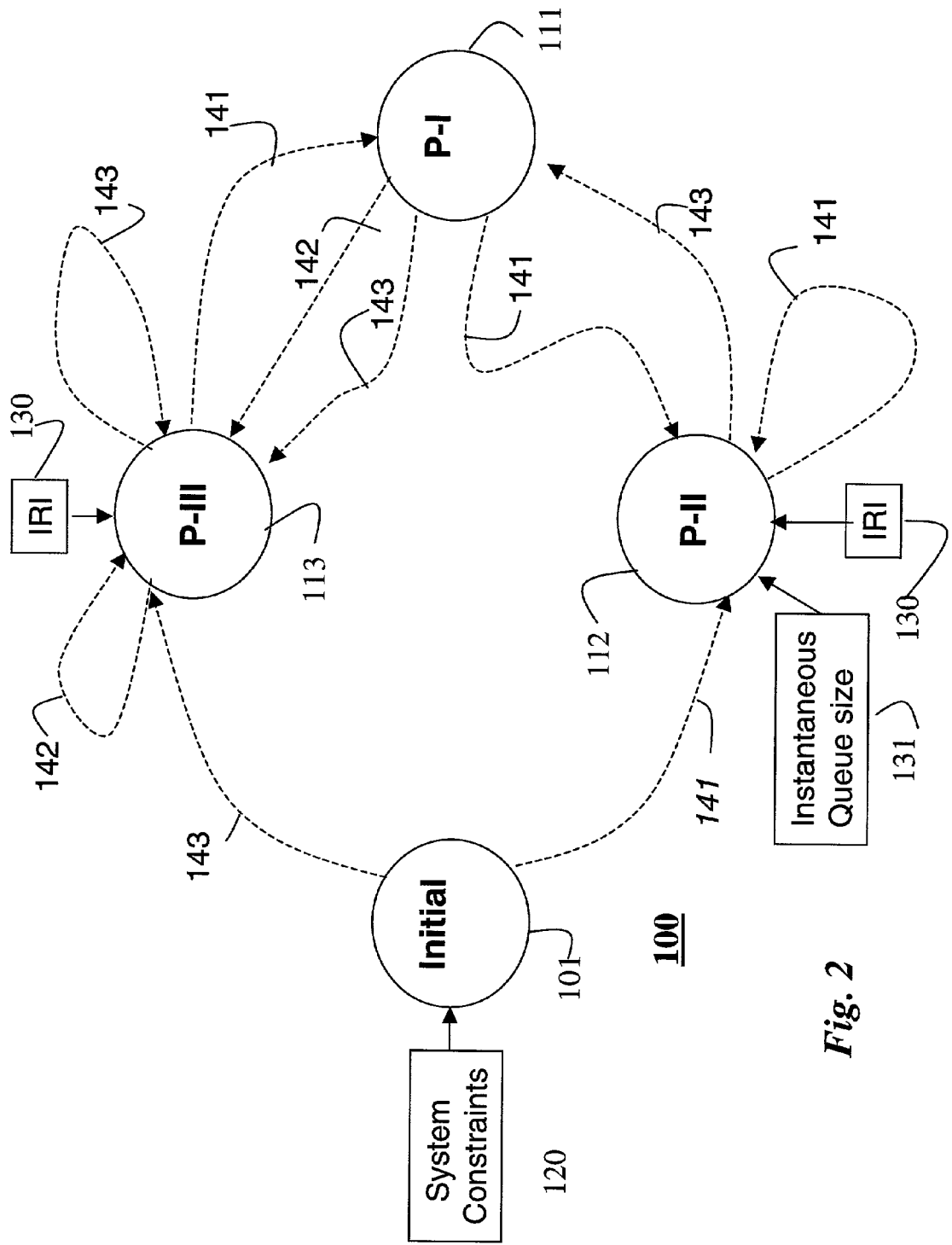
FIG. 2 is a block diagram of a finite state machine used by a resource allocation method according to the invention.

FIG. 2 shows a finite state machine (FSM) 100 that can be used for dynamic asynchronous bandwidth allocation according to the invention. The FSM 100 includes an initial state 101, and three allocation states 111-113. The amount of bandwidth to allocate, e.g., bandwidths (P-I, P-II, P-III), is greatest for state P-II 112, and smallest for state P-III 113, i.e., P-II>P-I>P-III. The FSM 100 starts out in the initial state 101, subject to system constraints 120. The states 112-113 consider inter-renegotiation intervals (IRI) 130, and state P-II also considers an instantaneous queue size 131.

Interrupts

State transitions are triggered by three types of interrupts generated due to temporal changes in cost metrics. The cost functions that cause the interrupts are described in greater detail below. The interrupts are used to transition from one state to another. The interrupts are queue-size 141, low utilization 142, and under-utilization 143. Bandwidth (P-I, P-II, P-III) are then allocated according to the new state. For example, if the current state is 112, then the under-utilization interrupt 143 transitions to state 111, and the new bandwidth to allocate is returned as P-I.

In practice, it is more difficult to obtain additional bandwidth for streaming data, because the network may have to release bandwidth from other traffic flows or traffic sources to meet new demand. The multi-state model according to the invention prevents drastic changes in bandwidth allocation, and adaptively increases or decreases the bandwidth amount to allocate in a stepwise manner. Thus, the probability of getting additional bandwidth granted is increased. Because, there is no perfect predictor, and each prediction includes error, this tethered bandwidth allocation also lowers the impact of prediction errors on achieving high utilization.

Each state determines the bandwidth to be allocated according to the following analytical expression:

$$\text{PII: } X_{dc} + \sqrt{\max(E_i)} + b(n)/(\alpha \cdot \text{IRI}) \quad (1)$$

$$\text{PI: } X_{dc} + \sqrt{\min(E_i)} \quad (2)$$

$$\text{PIII: } X_{dc} + \sqrt{\min(E_i)} - u(n)/(\beta \cdot \text{IRI}) \quad (3)$$

where the variables are defined in FIG. 2, and i is the frequency sub-band index in wavelet analysis of the traffic data.

Further details on how to determine $X_{dc}$ and $E_i$ dynamically are described by Sahinoglu et al., in "*A Novel Adaptive Bandwidth Allocation: Wavelet decomposed Signal Energy Approach,*" Proc. of GLOBECOM'01, pp. 2253-2257, 2001 and U.S. patent application Ser. No. 09/842,973 "Adaptive Bandwidth Allocation by Wavelet Decomposition and Energy Analysis of Network Traffic," filed by Sahinoglu on Apr. 26, 2001, incorporated herein by reference.

Cost Functions

We use three cost functions to cause the interrupts 141-143. The goals of the cost functions are to maximize utilization, minimize buffering delays, and minimize the number of renegotiations. The cost functions are an under-utilization cost function u(n), a buffering cost function b(n) and a renegotiation cost function T(n). These three cost functions are determined by:

$$b(n) = \alpha \max(0, q(n-1) + X(n) - a(n)), \quad (4)$$

$$u(n) = \beta \cdot s(n), \quad (5)$$

$$\text{where } s(n) = \begin{cases} \min(0, s(n-1) + X(n) - a(n)), & q(n) = 0 \\ 0, & q(n) > 0 \end{cases}, \text{ and} \quad (6)$$

$$T(n) = \begin{cases} T_{\max}, & CFI - LRI < r \\ T_{\min}, & CFI - LRI > r \end{cases}.$$

From the above equations it can be seen that b(n) is always zero or positive, and u(n) is always zero or negative. We assume that renegotiation takes r time intervals. Therefore, a new renegotiation cannot be started until after r time intervals when the last one started. We also define a minimum threshold $T_{min}$ for the renegotiation cost, because even though a renegotiation may be feasible, it induces an additional signaling load on the network.

Whenever the under-utilization or buffering cost is less than $T_{min}$, or greater than $T_{max}$, i.e., the renegotiation cost boundaries, the low utilization 142 or queue-size 141 interrupt is created.

The under-utilization 143 interrupt is generated whenever the instantaneous utilization ρ(n) is very low, e.g., less than 0.3, and it causes average utilization $\bar{\rho}$ to fall under a utilization threshold, e.g., 0.9. In order to process this interrupt, the renegotiation cost must be at its lower limit.

Figure 3:
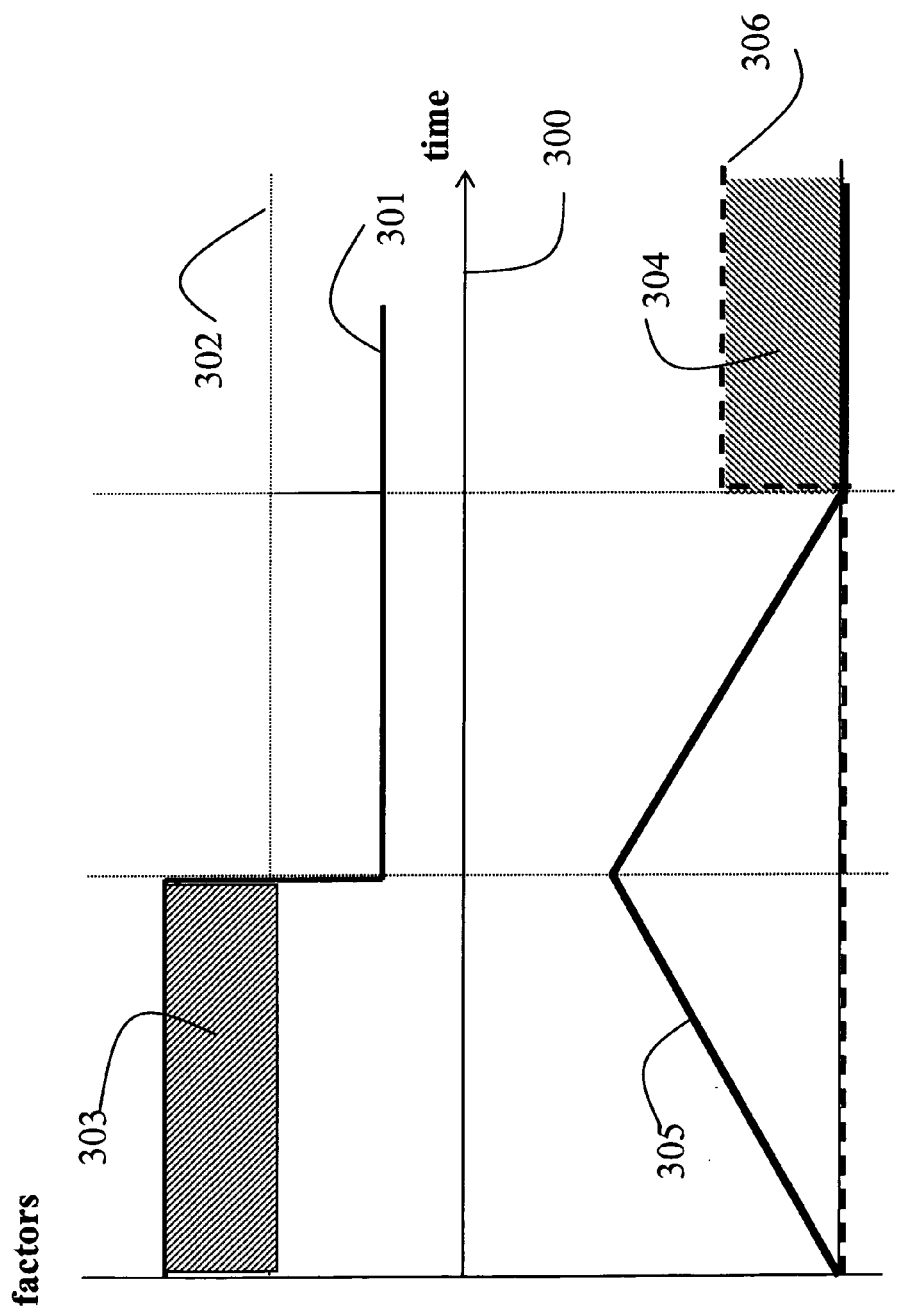
FIG. 3 is graph of factors contributing to cost functions evaluated according to the invention.

FIG. 3 shows the various factors that can contribute to the cost functions over time 300. These are arrival rate (bps) 301, service rate (bps) 302, buffering interval 303, under-utilization interval 304, queue size (bits) 305, and under-utilization 306.

Figure 4:
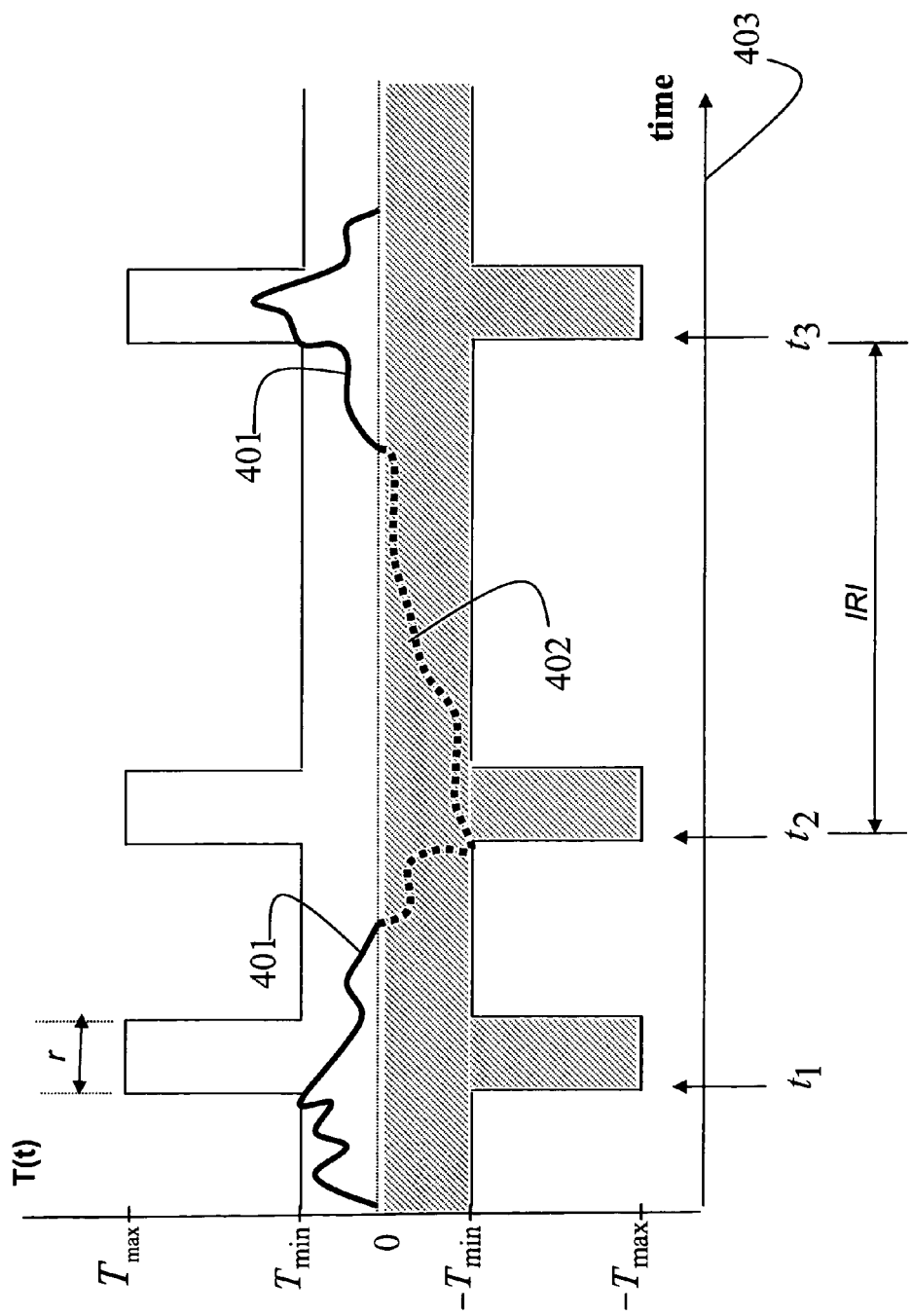
FIG. 4 is a graph of bandwidth allocation as a function of time.

FIG. 4 shows bandwidth reallocation instants $t_1$, $t_2$, $t_3$, and interrupt events due to buffering 401 and under-utilization 402 as a function of time 403.

Figure 5:
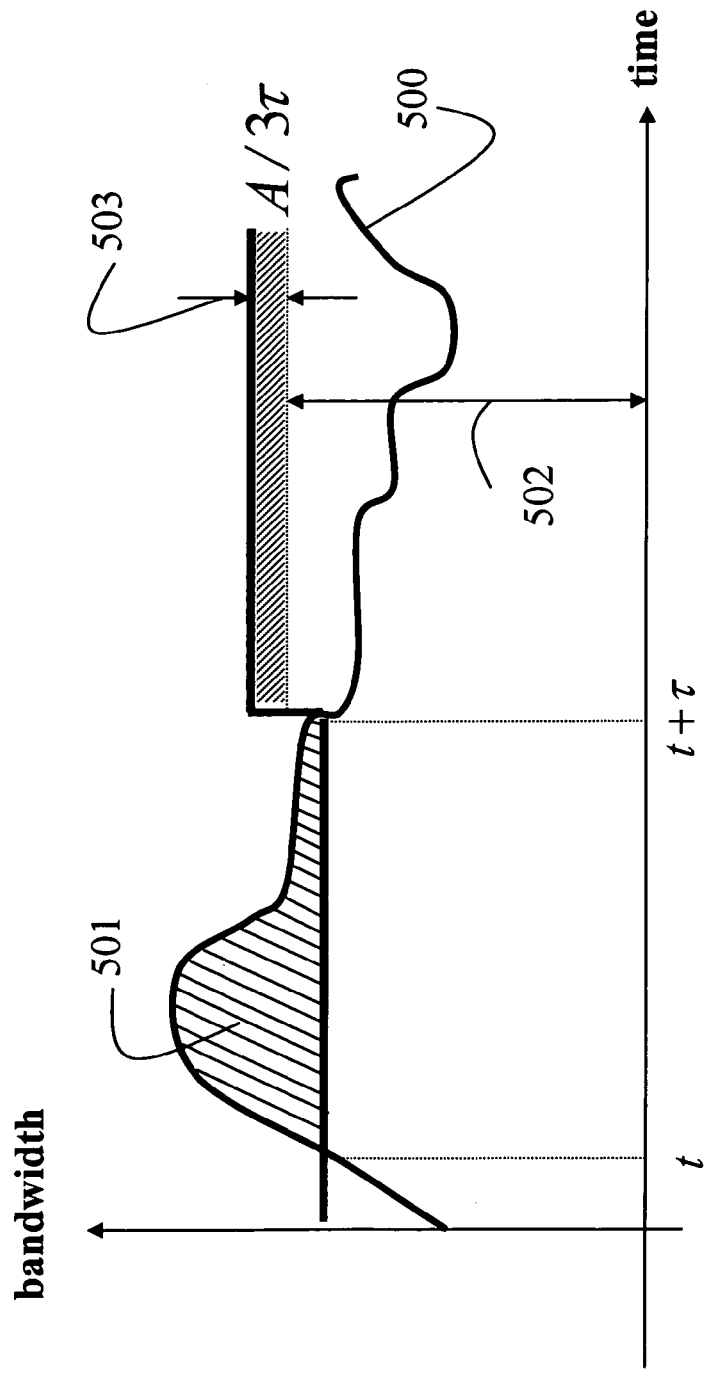
FIG. 5 is a graph of a bandwidth compensation factor according to the invention.

FIG. 5 shows a bandwidth compensation process, which can be added to the process shown in FIG. 4, when bandwidth 500 needs to be increased in state 112. For highly delay sensitive applications, this compensation process further improves delay performance at the expense of decreasing achievable utilization. Here, buffering begins at time t, and renegotiation begins at time t+τ. The number of bits buffered 501 during the time interval τ is given $$A = \int_{t}^{t+\tau} ((X(t) - a(t)) dt,$$

i.e., the area 501 under the curve that is equal to the amount (over time) that the arrival rate is greater than the allocated bandwidth.

Assume that transmit delay is negligable compared to buffering delay, and an interframe interval is 40 ms, e.g., an MPEG-1 coded video. For video streaming applications, the tolerable end-to-end delay is within 50 to 120 ms. Then, 120 ms is the maximum buffering delay allowed. Until forwarding of the frame with 120 ms buffering delay, three new frames are stored in the buffer. Therefore, it is desired to empty the buffer faster to provision end-to-end delay constraints for the stream. Therefore, the allocated bandwidth 502 is increased by A/3τ 503 to decrease buffering delay.

EFFECT OF THE INVENTION

FIGS. 6a and 6b compare the performance of the invented method (R++) with prior art methods for the MPEG-1 "Star Wars" and "Soccer Videos." These are available from the University of Wuerzburg, Institute of Computer Science III, Am Hubland, 97074 Wuerzburg, Germany. The method and system as described herein can achieve the same queue size performance as the prior art RCBR method of Grossglauser et al., with 2% better utilization, and 24% less renegotiations. It also outperforms the RDBA, NLMS methods, and the method described by Casilari et al. For example, where NLMS method requires 780 reallocations for 3333 GOPs, the present method only takes 882 renegotiations for 40,000 frames. When the method is used for GOP predictions, it also achieves a smaller number of renegotiations (N), a lower 0.99 quantile queue size (B), and a higher average utilization $\bar{\rho}$ than NLMS. The high performance of R++ is also confirmed by the results for the soccer trace.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

I claim:

1. A method for dynamically allocating bandwidth to traffic having a variable data rate in a network, comprising:
   allocating a first amount P-I of bandwidth in a first state of a state machine;
   allocating a second amount P-II of bandwidth in a second state of the state machine:
   allocating a third amount of bandwidth P-II in a third state of the state machine such that P-II>P-I>P-III;
   periodically evaluating plurality of cost functions to transition between the first and second states, and between the first and third states of the state machine; and
   allocating dynamically, to traffic having the variable data rate in the network, the bandwidth corresponding to the state transitions.

2. The method of claim 1 wherein the cost functions comprise an under-utilization cost function u(n), a buffering cost function b(n), and a renegotiation cost function T(n).

3. The method of claim 2 wherein the costs functions are $b(n)=\alpha\max(0,q(n-1)+X(n)-a(n))$, $u(n)=\beta \cdot s(n)$, $$\text{where} \quad s(n) = \begin{cases} \min(0, s(n-1) + X(n) - a(n)), & q(n) = 0 \\ 0, & q(n) > 0 \end{cases}, \text{and}$$

$$T(n) = \begin{cases} T_{\max}, & CFI - LRI < r \\ T_{\min}, & CFI - LRI > r \end{cases},$$

where n is a time slot, α a is buffering cost coefficient, q is a queue size, X is a number of bits received, a is bandwidth allocated during a time slot, β is an under utilization cost coefficient, s is an under-utilization, T is a renegotiation cost, CFI is a current frame index, and LRI is a frame index.

4. The method of claim 2 wherein the under-utilization cost function u(n) generates an under-utilization interrupt, the buffering cost function b(n) generates a queue-size interrupt, and the renegotiation cost function T(n) generates a low utilization interrupt to transition between the first and second states of the state machine, and between the first and third states of the state machine.

5. The method of claim 1 wherein the amounts of bandwidth allocated are:

PII: $X_{dc}+\sqrt{\max(E_i)}+b(n)/(\alpha \cdot IRI)$,

PI: $X_{dc}+\sqrt{\min(E_i)}$, and

PIII: $X_{dc}+\sqrt{\min(E_i)}-u(n)/(\beta \cdot IRI)$, where n is a time slot, x is a number of bits received, b is a buffering cost, α is a buffering cost coefficient, IRI is an inter-renegotiation interval, E is a signal energy in a frequency sub-band i, u is an under-utilization cost, and β is an under-utilization cost coefficient.

* * * * *